US012762728B2

(12) United States Patent
Ravi Kumar et al.

(10) Patent No.: US 12,762,728 B2
(45) Date of Patent: Oct. 13, 2026

(54) MULTIMODAL 3D OBJECT DETECTION USING TEMPORAL AND STRUCTURE CONSISTENCY IN VOXEL FEATURE SPACE

(71) Applicant: QUALCOMM Incorporated, San Diego, CA (US)

(72) Inventors: Varun Ravi Kumar, San Diego, CA (US); Senthil Kumar Yogamani, Headford (IE); Venkatraman Narayanan, Farmington Hills, MI (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/516,590

(22) Filed: Nov. 21, 2023

(65) Prior Publication Data

US 2025/0166216 A1 May 22, 2025

(51) Int. Cl.

*G06T 7/70* (2017.01)
*G06T 17/00* (2006.01)

(Continued)

(52) U.S. Cl.

CPC ................ *G06T 7/70* (2017.01); *G06T 17/00* (2013.01); *G06V 10/44* (2022.01); *G06V 10/54* (2022.01);

(Continued)

(58) Field of Classification Search

None

See application file for complete search history.

(56) References Cited

U.S. PATENT DOCUMENTS

| | | | | |
|---|---|---|---|---|
| 2018/0315154 | A1 | 11/2018 | Park et al. | |
| 2020/0195904 | A1* | 6/2020 | Tauber | H04N 13/156 |
| 2020/0250468 | A1 | 8/2020 | Kim et al. | |
| 2020/0342653 | A1* | 10/2020 | Dupuis | G06T 15/08 |
| 2021/0276595 | A1 | 9/2021 | Casas et al. | |
| 2021/0406560 | A1 | 12/2021 | Park et al. | |

(Continued)

FOREIGN PATENT DOCUMENTS

| | | | |
|---|---|---|---|
| CN | 111191735 | A | 5/2020 |
| EP | 4009269 | A1 | 6/2022 |

OTHER PUBLICATIONS

Baranchuk D., et al., "Label-Efficient Semantic Segmentation with Diffusion Models", International Conference on Learning Representations, Dec. 6, 2021, Published on Jan. 28, 2022, pp. 1-15.

(Continued)

*Primary Examiner* — Matthew C Bella
*Assistant Examiner* — Johnny B Duong
(74) *Attorney, Agent, or Firm* — Shumaker & Sieffert, P. A.

(57) ABSTRACT

An example device for detecting objects through processing of media data, such as image data and point cloud data, includes a processing system configured to form voxel representations of a real-world three-dimensional (3D) space using images and point clouds captured for the 3D space at consecutive time steps, extract image and/or point cloud features for voxels in voxel representations of the 3D space, determine correspondences between the voxels at consecutive time steps according to similarities between the extracted features, and determine positions of objects in the 3D space using the correspondences between the voxels. For example, the processing system may perform triangulation according to positions of a moving object to positions of the voxels at the time steps. In this manner, the processing system may generate an accurate bird's eye view (BEV) representation of the real-world 3D space.

20 Claims, 6 Drawing Sheets

(51) Int. Cl.

| | |
|---|---|
| ***G06V 10/44*** | (2022.01) |
| ***G06V 10/54*** | (2022.01) |
| ***G06V 10/56*** | (2022.01) |
| ***G06V 10/60*** | (2022.01) |
| ***G06V 10/74*** | (2022.01) |

(52) U.S. Cl.

CPC .............. *G06V 10/56* (2022.01); *G06V 10/60* (2022.01); *G06V 10/761* (2022.01); *G06V 2201/07* (2022.01)

(56) References Cited

U.S. PATENT DOCUMENTS

| | | | | |
|---|---|---|---|---|
| 2022/0398851 | A1 | 12/2022 | Nehmadi et al. | |
| 2023/0004805 | A1 | 1/2023 | Tawari et al. | |
| 2023/0027212 | A1 | 1/2023 | Goeddel et al. | |
| 2023/0109909 | A1 | 4/2023 | Meng et al. | |
| 2024/0144595 | A1 * | 5/2024 | Ponjou Tasse | G06V 10/82 |
| 2025/0078402 | A1 * | 3/2025 | Chandler | G06T 7/73 |

OTHER PUBLICATIONS

Deng K., et al., "Depth-Supervised NeRF: Fewer Views and Faster Training for Free", arXiv:2107.02791v2 [cs.CV], Apr. 29, 2022, pp. 12882-12891.

Ho J., et al., "Denoising Diffusion Probabilistic Models", arXiv:2006.11239v2 [cs.LG], 34th Conference on Neural Information Processing Systems, Dec. 16, 2020, pp. 1-25.

Jia S., et al., "Self-Supervised Depth Estimation Leveraging Global Perception and Geometric Smoothness Using On-board Videos", arXiv:2106.03505v1 [cs.CV], Jun. 7, 2021, pp. 1-16.

Lu Y-J., et al., "Conditional Diffusion Probabilistic Model for Speech Enhancement", arXiv:2202.05256v1 [eess.AS], Feb. 10, 2022, 6 pages.

Nguyen T.M., et al., "Wasserstein Generative Adversarial Network for Depth Completion With Anisotropic Diffusion Depth Enhancement", IEEE Access, vol. 10, Jan. 20, 2022, pp. 6867-6877.

Saxena S., et al., "Monocular Depth Estimation using Diffusion Models", arXiv:2302.14816v1 [cs.CV], Feb. 28, 2023, 15 pages.

Schilling H., et al., "Mind the Gap—A Benchmark for Dense Depth Prediction Beyond Lidar", 2020 IEEE/CVF Conference on Computer Vision and Pattern Recognition Workshops (CVPRW), Jun. 2020, 10 pages.

Shu C., et al., "Feature-metric Loss for Self-supervised Learning of Depth and Egomotion", arXiv:2007.10603v1 [cs.CV] Jul. 21, 2020, 16 Pages.

Tan B., et al., "PlaneTR: Structure-Guided Transformers for 3D Plane Recovery", IEEE, Computer vision Foundation, Jul. 2021, pp. 4186-4195.

Xu., W., et al., "Self-Supervised Monocular Depth Learning in Low-Texture Areas", Remote Sensing, vol. 13, 1673, Apr. 26, 2021, 17 Pages.

* cited by examiner

MULTIMODAL 3D OBJECT DETECTION USING TEMPORAL AND STRUCTURE CONSISTENCY IN VOXEL FEATURE SPACE

TECHNICAL FIELD

This disclosure relates to artificial intelligence, particularly as applied to autonomous driving systems.

BACKGROUND

Techniques are being researched and developed related to autonomous driving and advanced driving assistance systems. For example, artificial intelligence and machine learning (AI/ML) systems are being developed and trained to determine how best to operate a vehicle according to applicable traffic laws, safety guidelines, external objects, roads, and the like. Using cameras to collect images, depth estimation is performed to determine depths of objects in the images. Depth estimation can be performed by leveraging various principles, such as calibrated stereo imaging systems and multi-view imaging systems.

Various techniques have been used to perform depth estimation. For example, test-time refinement techniques include applying an entire training pipeline to test frames to update network parameters, which necessitates costly multiple forward and backward passes. Temporal convolutional neural networks rely on stacking of input frames in the channel dimension and bank on the ability of convolutional neural networks to effectively process input channels. Recurrent neural networks may process multiple frames during training, which is computationally demanding due to the need to extract features from multiple frames in a sequence and does not reason about geometry during inference. Techniques using an end-to-end cost volume to aggregate information during training are more efficient than test-time refinement and recurrent approaches, but are still non-trivial and difficult to map to hardware implementations.

SUMMARY

In general, this disclosure describes techniques for determining positions of objects in a real-world environment in a bird's eye view (BEV) representation using images and light detection and ranging (LIDAR)-generated point clouds. In particular, at a given time step t, an image and point cloud are captured. Features are extracted from the image and the point cloud, and applied to voxels corresponding to objects in the image and/or point cloud. Correspondences between the voxels may be determined over time, e.g., between a previous time step t−1 and the current time step t, as well as between the current time step t and a next time step t+1. Voxels that share similar or identical image and/or point cloud features and that are spatially close to each other between time steps may be determined to correspond, i.e., to represent the same object of the real-world environment. Pose data for the camera and/or LIDAR unit may then be used to triangulate positions of the real-world objects, such that the BEV representation can be generated from the positions of the real-world objects. In this manner, the BEV may more accurately reflect the real-world objects.

In one example, a method of processing media data includes forming a first voxel representation of a three-dimensional space at a first time using a first image of the three-dimensional space captured by a camera of a moving object having a first pose and a first point cloud of the three-dimensional space captured by a unit of the moving object; determining a first set of features for voxels in the first voxel representation, the first set of features representing visual characteristics of the corresponding voxels; forming a second voxel representation of the three-dimensional space at a second time using a second image of the three-dimensional space captured by the camera of the moving object having a second pose and a second point cloud of the three-dimensional space captured by the unit of the moving object; determining a second set of features for voxels in the second voxel representation; determining correspondences between the voxels in the first voxel representation and the voxels in the second voxel representation according to similarities between the first set of features and the second set of features; and determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

In another example, a device for processing media data includes a memory for storing media data; and a processing system comprising one or more processors implemented in circuitry, the processing system being configured to: form a first voxel representation of a three-dimensional space at a first time using a first image of the three-dimensional space captured by a camera of a moving object having a first pose and a first point cloud of the three-dimensional space captured by a unit of the moving object; determine a first set of features for voxels in the first voxel representation, the first set of features representing visual characteristics of the corresponding voxels; form a second voxel representation of the three-dimensional space at a second time using a second image of the three-dimensional space captured by the camera of the moving object having a second pose and a second point cloud of the three-dimensional space captured by the unit of the moving object; determine a second set of features for voxels in the second voxel representation; determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

In another example, a device for processing media data includes means for forming a first voxel representation of a three-dimensional space at a first time using a first image of the three-dimensional space captured by a camera of a moving object having a first pose and a first point cloud of the three-dimensional space captured by a unit of the moving object; means for determining a first set of features for voxels in the first voxel representation, the first set of features representing visual characteristics of the corresponding voxels; means for forming a second voxel representation of the three-dimensional space at a second time using a second image of the three-dimensional space captured by the camera of the moving object having a second pose and a second point cloud of the three-dimensional space captured by the unit of the moving object; means for determining a second set of features for voxels in the second voxel representation; means for determining correspondences between the voxels in the first voxel representation and the voxels in the second voxel representation according to similarities between the first set of features and the second set of features; and means for determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

In another example, a computer-readable storage medium has stored thereon instructions that, when executed, cause a processing system to form a first voxel representation of a three-dimensional space at a first time using a first image of the three-dimensional space captured by a camera of a moving object having a first pose and a first point cloud of the three-dimensional space captured by a unit of the moving object; determine a first set of features for voxels in the first voxel representation, the first set of features representing visual characteristics of the corresponding voxels; form a second voxel representation of the three-dimensional space at a second time using a second image of the three-dimensional space captured by the camera of the moving object having a second pose and a second point cloud of the three-dimensional space captured by the unit of the moving object; determine a second set of features for voxels in the second voxel representation; determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

The details of one or more examples are set forth in the accompanying drawings and the description below. Other features, objects, and advantages will be apparent from the description, drawings, and claims.

DETAILED DESCRIPTION

Figure 1:
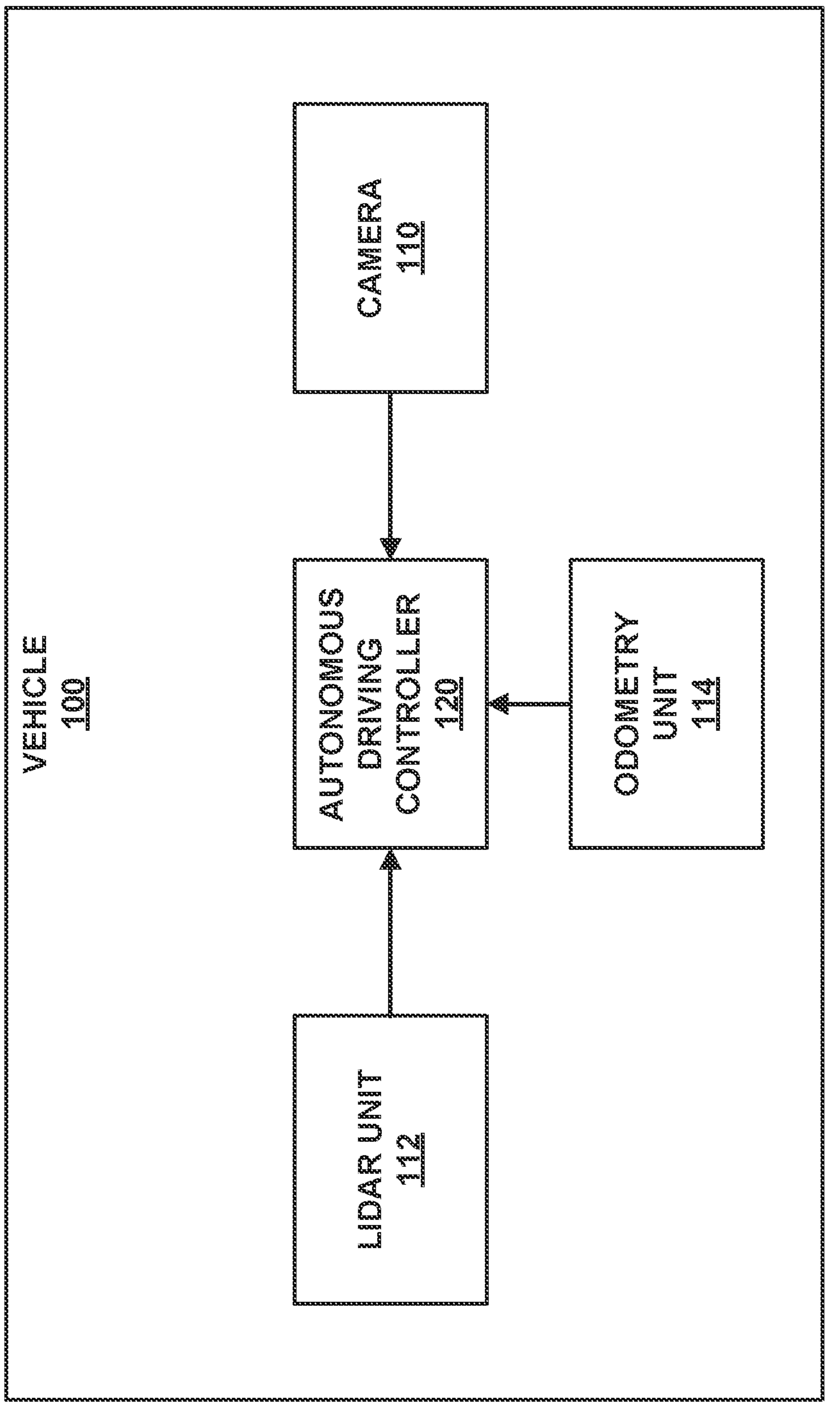
FIG. 1 is a block diagram illustrating an example vehicle including an autonomous driving controller according to techniques of this disclosure.

Depth estimation is an important component of autonomous driving (AD), autonomous driving assistance systems (ADAS), or other systems used to partially or fully autonomously control a vehicle or other device, e.g., for robot navigation. Depth estimation may also be used for extended reality (XR) related tasks, such as augmented reality (AR), mixed reality (MR), or virtual reality (VR). Depth information is important for accurate 3D detection and scene representation. Depth estimation for such techniques may be used for autonomous driving, assistive robotics, augmented reality/virtual reality scene composition, image editing, or other such techniques. Other types of image processing can also be used for AD/ADAS or other such systems, such as semantic segmentation, object detection, or the like. Autonomous vehicles may use various sensors such as light detection and ranging (LIDAR) units, RADAR units, and/or one or more cameras (e.g., monocular cameras, stereo cameras, or multi-camera arrays, which may face different directions).

Three-dimensional object detection (3DOD) may include generating a bird's eye view (BEV) representation of a three-dimensional space. That is, while cameras may capture images to the sides of a moving object, such as a vehicle, the camera data may be used to generate a bird's eye view perspective, i.e., a top-down perspective. Downstream tasks, such as object tracking and prediction, may benefit from a BEV representation. Some such techniques do not have a confidence measure at the feature level.

Center-based techniques, such as CenterPoint, may be used to predict the center points of objects in the BEV, then regress the 3D dimensions and orientation of the objects around those center points. However, these techniques may face challenges in accurately estimating the confidence of object detection features and handling object variability.

The techniques of this disclosure include a Structure from Motion (SfM) based approach that may provide a more accurate confidence estimation. These techniques may include analyzing the consistency of reconstructed 3D voxel features. Through measuring the re-projection error or evaluating the consistency across multiple frames, these techniques may provide a reliable measure of confidence in the presence and properties of objects. This can help to distinguish reliable detections from potential false positives.

The techniques of this disclosure may also leverage triangulation and bundle adjustment. Thus, the SfM-based approach of these techniques may improve the accuracy of object localization. These techniques may result in estimating the 3D structure of a real world scene accurately, leading to improved prediction of object dimensions and orientation. This can help to reduce localization errors and improve the overall quality of object detection.

The SFM-based approach of the techniques of this disclosure is not limited of fixed anchor-based representations. These techniques can handle various object scales and orientations effectively. This flexibility is particularly beneficial in scenarios where objects have diverse shapes, sizes, and orientations. This allows the network to adapt to different object variations and improve the detection performance.

BEV-based methods may have difficulty accurately estimating object scale and orientation, particularly when objects have non-standard or extreme sizes and/or orientations. The SfM-based approach of the techniques of this disclosure, however, may consider 3D voxel features and leverage bundle adjustment, which may provide more flexibility in handling object variability. Thus, these techniques may lead to improved predictions of object dimensions and poses.

Conventional multi-camera CenterPoint BEV methods typically directly generate a BEV representation by projecting 2D images onto the ground space. This representation can be rich in semantic and texture information. By contrast, the SfM-based approach of this disclosure may reconstruct the 3D voxel structure, which primarily captures geometric properties of the scene.

Figure 5:
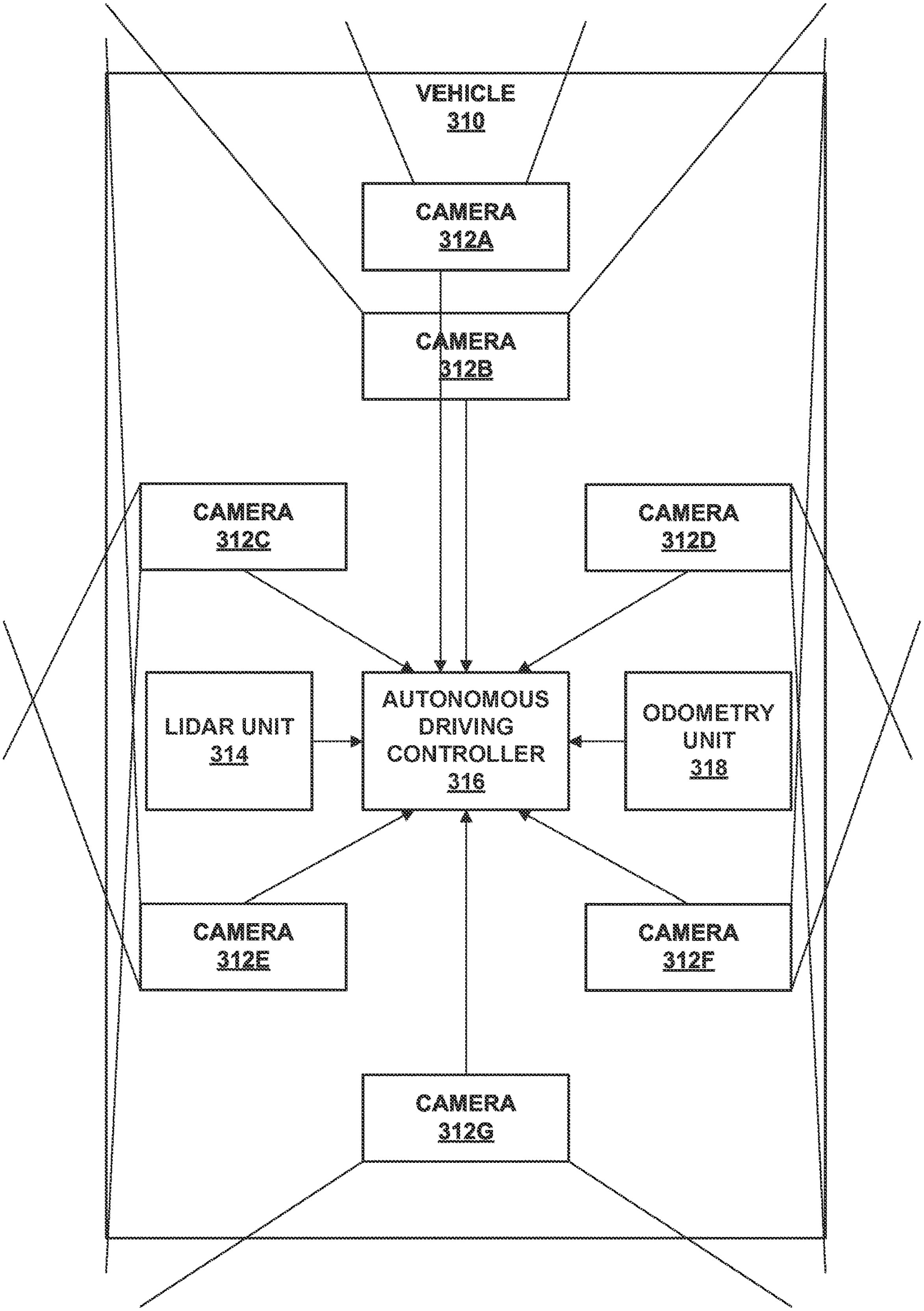
FIG. 5 is a block diagram illustrating an example vehicle with a multi-camera system and an autonomous driving controller according to techniques of this disclosure.

FIG. 1 is a block diagram illustrating an example vehicle 100 including an autonomous driving controller 120 according to techniques of this disclosure. In this example, vehicle 100 includes camera 110, light detection and ranging (LIDAR) unit 112, odometry unit 114, and autonomous driving controller 120. Camera 110 is a single camera in this example. While only a single camera is shown in the example of FIG. 1, in other examples, multiple cameras may be used. However, the techniques of this disclosure allow for depth to be calculated for objects in images captured by camera 110 without additional cameras. In some examples, multiple cameras may be employed that face different directions, e.g., front, back, and to each side of vehicle 100, e.g., as shown in FIG. 5. Autonomous driving controller 120 may be configured to calculate depth for objects captured by each of such cameras.

The techniques of this disclosure are generally described with respect to vehicle 100. However, these techniques are not limited to contexts involving a vehicle. These techniques may be employed with respect to other moving objects, e.g., robots, drones, or other moving objects. Furthermore, these techniques may be employed in any other context involving generation of a bird's eye view (BEV) representation of a real-world or virtual environment, e.g., for extended reality (XR), augmented reality (AR), virtual reality (VR), or mixed reality (MR).

LIDAR unit 112 provides LIDAR data (e.g., point cloud data) for vehicle 100 to autonomous driving controller 120. LIDAR unit 112 may, for example, determine a point cloud for a three-dimensional area, where camera 110 also captures an image of the area. The point cloud may generally include points corresponding to surfaces or objects in the area identified by a light (e.g., laser) emitted by LIDAR unit 112 and reflected back to LIDAR unit 112. Based on the angle of emission of the light from LIDAR unit 112 and time taken for the light to traverse from LIDAR unit 112 to the object and back, LIDAR unit 112 can determine a three-dimensional coordinate for the point.

Odometry unit 114 provides odometry data to autonomous driving controller 120. Odometry data may include position (e.g., x-, y-, and z-coordinate data) and/or rotation data (e.g., pitch, yaw, and/or roll data) to autonomous driving controller 120. Odometry unit 114 may correspond to a global positioning system (GPS) unit or other unit for determining position and rotation data.

Autonomous driving controller 120 receives image frames captured by camera 110 at a high frame rate, such as 30 fps, 60 fps, 90 fps, 120 fps, or even higher. Autonomous driving controller 120 also receives point cloud data captured by LIDAR unit 112 at a corresponding rate, such that a point cloud is paired with the image frame (or frames of a multi-camera system). Autonomous driving controller 120 may include a neural network trained according to the techniques of this disclosure to generate a depth map using fused features extracted from the frame(s) and the point cloud, along with odometry information received from odometry unit 114.

According to the techniques of this disclosure, autonomous driving controller 120 may receive a point cloud or other such data structure from LIDAR unit 112 and image data from camera 110 at a current time. Autonomous driving controller 120 may convert the point cloud (which may also be considered a type of range data) and camera image data into a voxel representation. For example, autonomous driving controller 120 may discretize a 3D space (of which camera 110 captures an image and for which LIDAR unit 112 captures a point cloud) around vehicle 100 into a grid of voxels, where each voxel represents a small 3D element of the 3D space.

Autonomous driving controller 120 may then extract relevant features for each voxel. The features can include occupancy information (e.g., whether a voxel is occupied by an object or not, e.g., as indicated by whether the point cloud indicates that a point exists within the voxel), intensity values, color values, or local geometric descriptors for the LIDAR data. The features may also include camera features, such as color information, texture descriptors, or local image features. In this manner, the voxel features (both LIDAR and camera features) may capture the visual characteristics of the image and LIDAR content within each voxel.

Autonomous driving controller 120 may also determine pose information for any or all of vehicle 100, LIDAR unit 112, and/or camera 110, e.g., using odometry data from odometry unit 114, which may be a global positioning system (GPS) unit. Determination of the pose information may indicate a position and orientation of vehicle 100, LIDAR unit 112, and/or camera 110 relative to the 3D scene. The pose data may include position and rotation information. The pose information may provide viewpoint information for subsequent 3D reconstruction of the 3D scene.

Autonomous driving controller 120 may determine pose information and receive point cloud data and image data for a sequence of times. Autonomous driving controller 120 may establish correspondences between voxel features across time steps t−1, t (where t represents a current time), and t+1 using the pose information, point cloud, and image data. Autonomous driving controller 120 may then match voxel features across these time steps based on spatial proximity and similarity to identify corresponding voxels between the different time steps.

To establish voxel correspondence across different time steps, autonomous driving controller 120 may apply a spatial proximity criterion. Autonomous driving controller 120 may compare voxel features from the current time step with features from the previous and/or next time step based on the spatial locations of the features. Autonomous driving controller 120 may determine that voxel cells that are close in space and that have similar features between concurrent time steps potentially correspond. To determine distances between voxels, autonomous driving controller 120 may calculate Euclidean distance, which is calculated between voxel centroids or voxel centers of two voxels. The voxel cells with smaller Euclidean distances may be considered spatially close to each other. Autonomous driving controller 120 may adjust the size of voxel grid cells to influence spatial proximity. Smaller voxel sizes may result in higher spatial resolution and more precise proximity determination.

In addition, or in the alternative, to spatial proximity, autonomous driving controller 120 may consider feature similarity to refine voxel correspondences. Autonomous driving controller 120 may compare feature similarity using measurements such as Euclidean distance or feature descriptor matching to assess the similarity between voxel features. Corresponding voxels should have similar features. Thus, when two voxels of two different time steps have similar features, there is a high likelihood that the two voxels correspond to each other, i.e., represent the same voxel or portion of a real world object in the real world space.

Based on the spatial proximity and/or feature similarity measures, autonomous driving controller 120 may establish correspondences between voxel cells across time steps. Autonomous driving controller 120 may match voxels of a current time step (time t) with most similar voxels in previous (time t−1) and/or next (time t+1) time steps, forming voxel correspondences. This enables subsequent steps, such as triangulation and bundle adjustment, for accurate 3D structure estimation and camera pose refinement.

Figure 2:
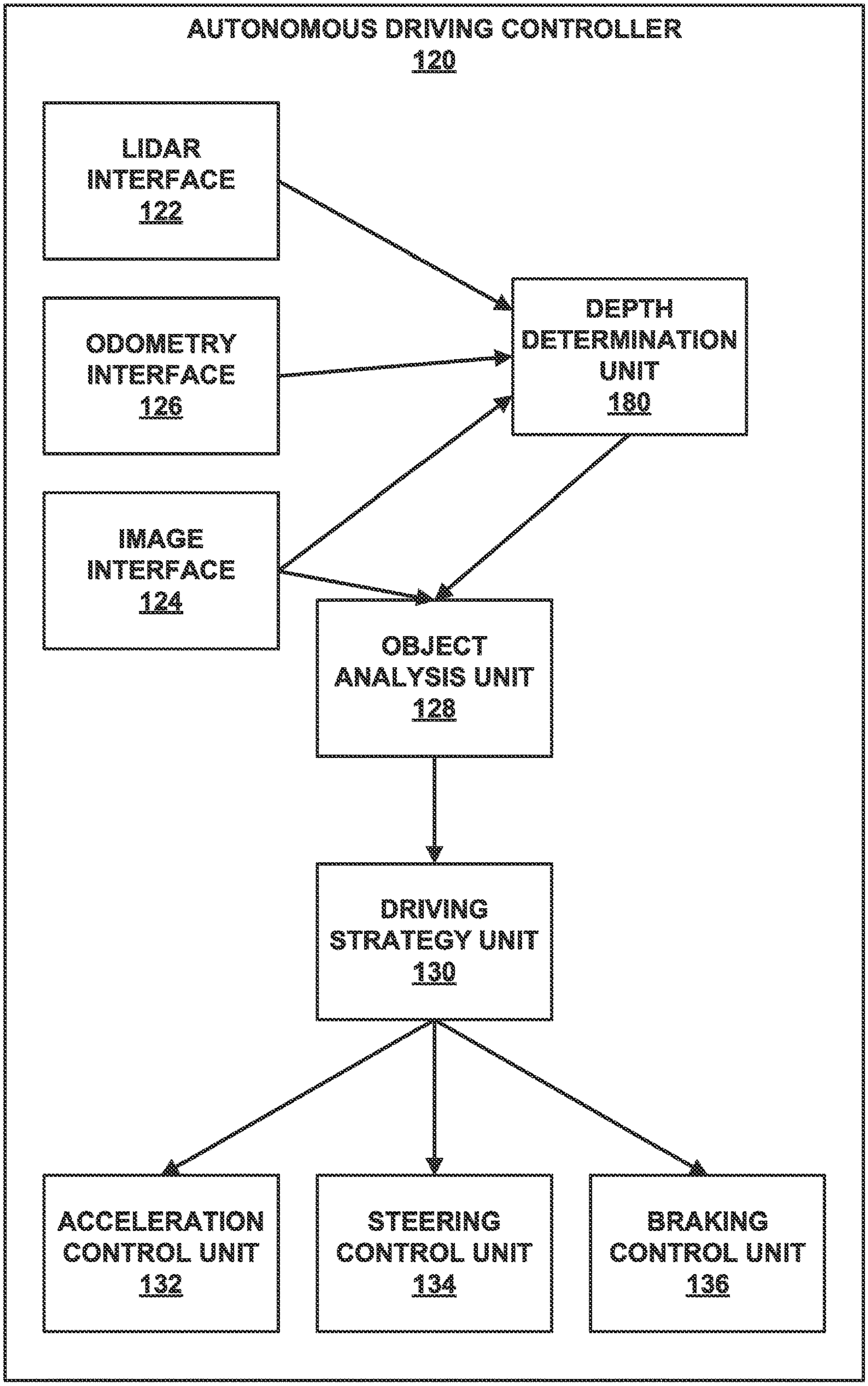
FIG. 2 is a block diagram illustrating an example set of components of an autonomous driving controller according to techniques of this disclosure.

FIG. 2 is a block diagram illustrating an example set of components of autonomous driving controller 120 of FIG. 1 according to techniques of this disclosure. In this example, autonomous driving controller 120 includes LIDAR interface 122, image interface 124, odometry interface 126, depth determination unit 180, object analysis unit 128, driving strategy unit 130, acceleration control unit 132, steering control unit 134, and braking control unit 136.

In general, LIDAR interface 122 represents an interface to LIDAR unit 112 of FIG. 1, which receives LIDAR data (e.g., point cloud data) from LIDAR unit 112 and provides the LIDAR/point cloud data to depth determination unit 180. In particular, as described in greater detail below with respect to FIG. 3, depth determination unit 180 may extract point cloud features from the point cloud data and image features from the image frame, fuse the image features with the point cloud features, and then determine a depth map from the fused features, e.g., using a neural network. To train the neural network, per the techniques of this disclosure, initially, a ground truth depth map may be used. The ground truth depth map may be a dense depth map, that is, substantially denser than the point cloud generated by and received from LIDAR unit 112 via LIDAR interface 122.

According to the techniques of this disclosure, depth determination unit 180 may receive both image data via image interface 124 and point cloud data via LIDAR interface 122 for a series of time steps. Depth determination unit 180 may further receive odometry information via odometry interface 126. Depth determination unit 180 may extract image features from the images and LIDAR/point cloud features (e.g., occupancy) for voxels in a 3D representation of a real world space. Depth determination unit 180 may extract such features for each time step in the series. Furthermore, depth determination unit 180 may determine correspondences between voxels in each time step to track movement of real world objects represented by the voxels over time. Such movement may be used to predict where the objects will be in the future, e.g., if vehicle 100 (FIG. 1) continues to move in a current direction or were to alter trajectory.

Image interface 124 may also provide the image frames to object analysis unit 128. Likewise, depth determination unit 180 may provide depth values for objects in the images to object analysis unit 128. Object analysis unit 128 may generally determine where objects are relative to the position of vehicle 100 at a given time, and may also determine whether the objects are stationary or moving. Object analysis unit 128 may provide object data to driving strategy unit 130, which may determine a driving strategy based on the object data. For example, driving strategy unit 130 may determine whether to accelerate, brake, and/or turn vehicle 100. Driving strategy unit 130 may execute the determined strategy by delivering vehicle control signals to various driving systems (acceleration, braking, and/or steering) via acceleration control unit 132, steering control unit 134, and braking control unit 136.

The various components of autonomous driving controller 120 may be implemented as any of a variety of suitable circuitry components, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Figure 3:
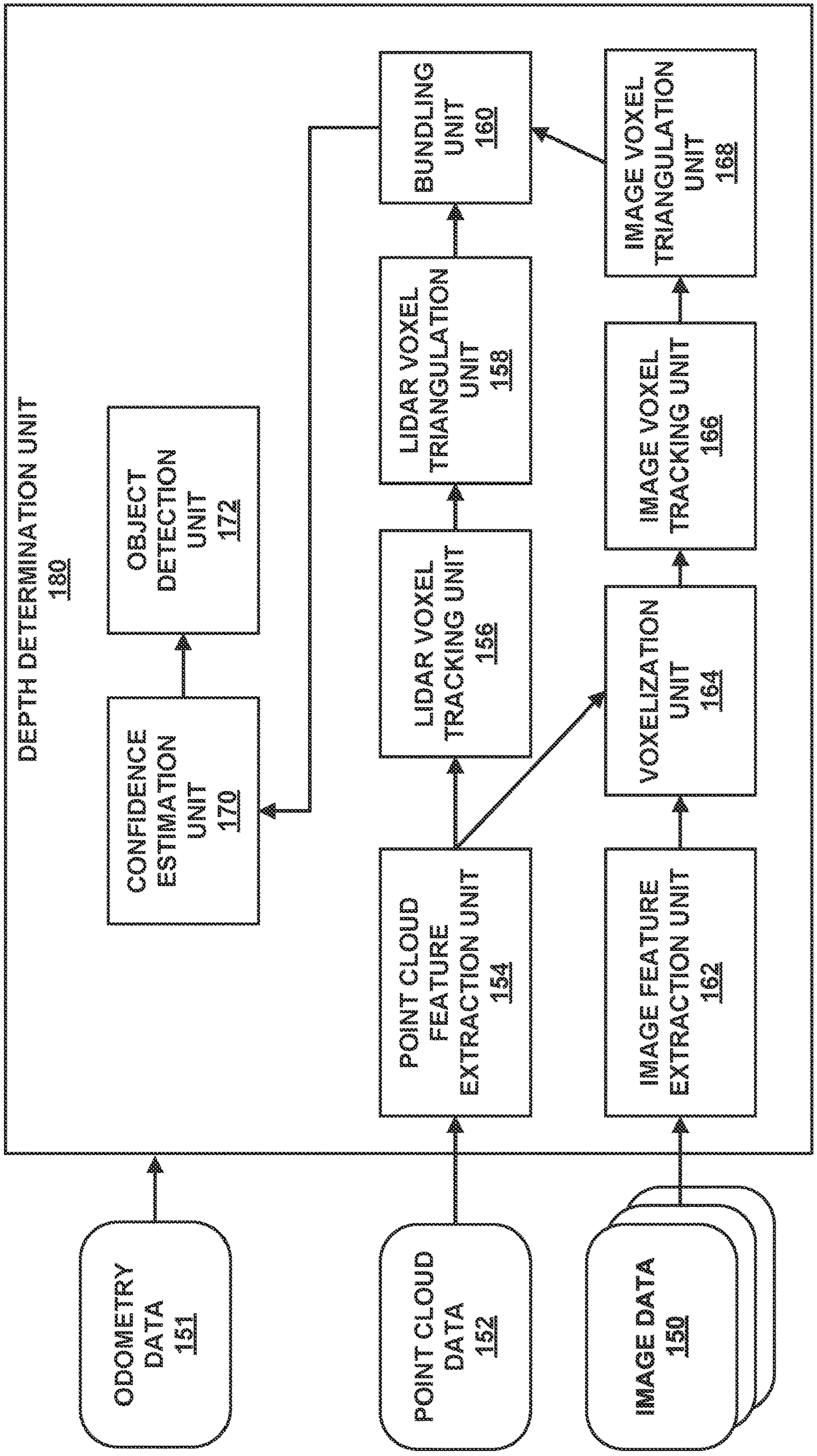
FIG. 3 is a block diagram illustrating an example set of components that may be included in a depth determination unit according to techniques of this disclosure.

FIG. 3 is a block diagram illustrating an example set of components that may be included in depth determination unit 180 of FIG. 2. In this example, depth determination unit 180 includes image feature extraction unit 162, point cloud feature extraction unit 154, LIDAR voxel tracking unit 156, LIDAR voxel triangulation unit 158, voxelization unit 164, image voxel tracking unit 166, image voxel triangulation unit 168, bundling unit 160, confidence estimation unit 170, and object detection unit 172.

Multi-modal inputs, such as image and point cloud/LIDAR inputs, may help to make more accurate predictions of depth maps, reduce reliance on a single sensor, and also address common issues such as sensor occlusion, e.g., if an object is obstructing one or more cameras and/or the LIDAR unit at a given time.

In this example, depth determination unit 180 receives one or more images in the form of image data (e.g., from one or more cameras, such as cameras in front, to the sides of, and/or to the rear of vehicle 100 of FIG. 1), odometry data 151, and point cloud data 152. Point cloud feature extraction unit 154 extracts LIDAR features from the point cloud data, such as occupancy information or local geometric descriptors. Point cloud feature extraction unit 154 may then form a voxel representation from point cloud data 152. For example, point cloud feature extraction unit 154 may determine that voxels representing positions of objects exist in a 3D representation for each voxel corresponding to an occupied node of point cloud data 152.

Point cloud feature extraction unit 154 provides the voxel representation to voxelization unit 164 and LIDAR voxel tracking unit 156. LIDAR voxel tracking unit 156 may compare voxels and LIDAR features for the voxels between several time periods, e.g., t−1, t (a current time), and t+1, and determine correspondences between the voxels across time. For instance, if a voxel at time t−1 and a voxel at time t are spatially close to each other and share common sets of LIDAR features, LIDAR voxel tracking unit 156 may determine that those two voxels correspond to the same voxel. Likewise, if a voxel at time t−1, a voxel at time t, and a voxel at time t+1 are spatially close to each other and share common sets of LIDAR features, LIDAR voxel tracking unit 156 may determine that those three voxels correspond to the same voxel.

LIDAR voxel triangulation unit 158 may then calculate distances between the corresponding voxels and vehicle 100 at each time, then use the calculated distances and the position of vehicle 100 at each time to perform triangulation to determine depth information for real world objects represented by the voxels, relative to vehicle 100. By tracking features of voxels, correspondences between the voxels can be tracked over time, and therefore, LIDAR voxel triangulation unit 158 may perform triangulation according to the positions of corresponding voxels at various times to improve the depth estimation for each real world object represented by the voxels.

Likewise, voxelization unit 164 may apply image data to the voxels for each time step. In this manner, in addition to tracking LIDAR features, image features such as color information, texture descriptors, or local image features can be used to track correspondences between the voxels over time. Image voxel tracking unit 166 may determine correspondences between the voxels over time based on the image features. Image voxel triangulation unit 168 may then also perform triangulation to determine depth values for real world objects represented by the image voxels.

Triangulation, as performed by LIDAR voxel triangulation unit 158 and image voxel triangulation unit 168, may involve finding intersection points of lines or rays emanating from corresponding voxel features in different time steps. This process may result in the estimation of the 3D positions of the triangulated voxels at each time step.

Bundling unit 160 may receive the depth values as determined by both LIDAR voxel triangulation unit 158 and image voxel triangulation unit 168. Bundling unit 160 may then merge and refine the estimated 3D structure and camera poses. Bundling unit 160 may perform a bundle adjustment optimization process to adjust the positions of the 3D points (triangulated voxels) and camera poses to minimize reprojection error between observed features and corresponding projections. By optimizing both the voxel positions and the camera poses, the accuracy and consistency of the reconstructed 3D structure may be improved.

The Structure from Motion (SfM) approach of the techniques of this disclosure may enable reconstruction of 3D structure and camera poses from multiple viewpoints. The SfM approach may include estimating 3D positions of voxel features and refining the camera poses to achieve a consistent and accurate representation of the scene. Determination of voxel correspondence, triangulation, and bundle adjustment, as discussed above, may be included in the SfM pipeline. These processes may collectively leverage temporal and spatial information from multiple frames to reconstruct the 3D structure and camera poses. By using voxel features from time steps t−1, t, and t+1, these steps may enable the SfM-based reconstruction and refinement of the scene's 3D representation.

Bundling unit 160 may provide this set of data to confidence estimation unit 170, which may check for consistency across time frames in 3D voxel space to generate confidence values for the depth values. Confidence estimation unit 170 may compute the consistency of the reconstructed 3D voxel features across time steps (e.g., t−1, t, and t+1) to calculate the confidence of object detection. This can be done by measuring the reprojection error of the 3D voxel features through evaluation of the consistency of the reconstructed 3D structure across multiple frames. Higher consistency may indicate higher confidence in the presence and properties of objects in the scene.

To perform voxel feature projection, confidence estimation unit 170 may obtain camera poses for frames t−1, t, and t+1 using odometry information, e.g., GPS information. Each camera poses may include a rotation matrix R and a translation vector t {x, y, z}. Given the 3D voxel features in the current frame (t), confidence estimation unit 70 may transform the 3D voxel features into the coordinate systems of frames t−1 and t+1 using inverse camera poses. Confidence estimation unit 170 may then apply the transformation to map the 3D voxel features from frame to the coordinate systems of frames t−1 and t+1.

Once the voxel features are projected onto the bird's eye view (BEV) image, confidence estimation unit 170 may calculate a reprojection error. The reprojection error measures the discrepancy between the projected voxel feature and the corresponding observed feature in the 3D voxel space. The reprojection error may quantify how well the projected voxel feature aligns with its corresponding location in 3D. The reprojection error can be computed as the distance between the projected voxel feature and the observed feature. For each voxel feature in frame t, confidence estimation unit 170 may find corresponding voxel features in frames t−1 and t+1. Confidence estimation unit 170 may calculate the Euclidean distance between the voxel feature in frame t and corresponding voxel features in frames t−1 and t+1. The distance represents the reprojection error in the 3D voxel space and indicates the alignment and consistency of the voxel features across the frames.

Confidence estimation unit 170 may use an error measurement metric to determine the confidence of object detection. For example, the Euclidean distance between the projected voxel feature and the observed feature may be used. A smaller distance may represent a higher consistency and confidence in the object detection result. Other metrics, such as pixel-wise distance or robust Huber loss, can also be used to account for outliers and improve the robustness of the confidence estimation. For example, for each correspondence c in C, confidence estimation unit 170 may calculate the Euclidean distance d(c) between voxel features $V_t$ and $V_{t+1}$ as:

$$d(c) = \|V_t(c) - V_{t+1}(c)\|$$

where d(c) is the distance between the two voxel features, $V_t(c)$ and $V_{t+1}(c)$, $V_t(c)$ is the voxel feature at location c in the $t^{th}$ frame, and $V_t(c)$ is the voxel feature at location c in the t+1th frame.

Based on the calculated reprojection errors, confidence estimation unit 170 may apply a thresholding mechanism to classify the confidence levels of the object detections. A predefined threshold may be set to distinguish between confident and uncertain detections. Object detections with reprojection errors below the threshold may be considered confident, indicating a high consistency between the projected voxel features and the observed 3D voxel features. Conversely, detections with reprojection errors above the threshold may be regarded as uncertain or potentially erroneous.

Confidence estimation unit 170 may perform a structure-based confidence estimation procedure. Confidence estimation unit 170 may compute an overlap between the 3D voxel features and an underlying ground truth structure in the scene. In some examples, to measure overlap, confidence estimation unit 170 may calculate an intersection over union (IoU) structure representing an IoU between the projected 3D bounding box of the voxel features and the ground truth bounding box. Higher values for the IoU structure may indicate better alignment between the voxel features and the ground truth structure, contributing to a higher confidence value.

Confidence estimation unit 170 may additionally or alternatively factor temporal consistency into the confidence value. For example, confidence estimation unit 170 may compute the Euclidean distance/Huber loss/L1 between a centroid of the 3D voxel features in the current frame (t) and corresponding centroids in the previous (t−1) and/or next (t+1) frames. These distances may be referred to as "dist_prev" and "dist_next," respectively. Confidence estimation unit 170 may then calculate the temporal consistency as the sum of these distances: TemporalConsistency=dist_prev+dist_next. Lower values of temporal consistency may indicate more stable and consistent object detections across frames.

Moreover, confidence estimation unit 170 may calculate a final confidence value or score. Confidence estimation unit 170 may assign a confidence value or score to each object detected based on its reprojection error. This score may indicate the level of confidence associated with the detection. Lower reprojection errors may correspond to higher confidence scores, while higher errors may result in lower confidence scores. Confidence estimation unit 170 may assign confidence scores to the object detections based on the consistency measure, where higher consistency values may indicate higher confidence.

Confidence estimation unit 170 may compute a confidence estimation function, such as a linear mapping or a non-linear mapping, to convert the consistency measure into a confidence score. For example, a simple linear mapping of $$ConfidenceScore = 1 - \frac{d(c)}{\text{max\_dist}}$$

may be used. In this example, max_dist is the maximum possible distance between voxel features. The confidence score may range from 0 to 1, where 1 indicates high confidence and 0 indicates low confidence. By measuring the reproduction error of 3D voxel features on the BEV images, this technique may provide an assessment of the consistency and reliability of object detection. This allows for the identification of confident detections based on accurate alignment between the voxel features and the observed features in the BEV view.

Confidence estimation unit 170 may then perform fusion and aggregation. That is, confidence estimation unit 170 may combine the structure-based confidence, temporal consistency, and confidence values to obtain an overall confidence score. This can be done using a weighted combination, such as:

$$OverallConfidence = w1 * StructureConfidence + w2 * TemporalConsistency + w3 * ConfidenceValue$$

In this equation, w1, w2, and w3 represent weighting factors that may control the influence of each confidence measure. The confidence value represents an additional confidence measure or score that may be specific to the application or context. By including the confidence value in the calculation, a more comprehensive assessment of the overall confidence of the 3D voxel features may be realized. The weighting factors w1, w2, and w3 all confidence estimation unit 170 to adjust the relative importance of each confidence measure based on their significance to the specific application or system requirements. Object detection unit 172 may then determine what objects are represented by the voxels and their positions relative to vehicle 100.

The techniques of this disclosure of integrating SfM with voxel features for 3D object detection in BEV space may offer certain benefits. As one example, these techniques may enhance accuracy of object detection. By leveraging SfM, these techniques may generate more accurate and robust 3D reconstructions of the scene. This improved accuracy in the 3D structure estimation may contribute to more reliable object detection and localization in the BEV space. As another example, these techniques may increase robustness to occlusions, that is, objects that cannot be detected at a time because another object is occluding vision of those objects. SfM based reconstruction may help overcome the challenges of occlusions in the BEV space. By considering multiple viewpoints and incorporating temporal information from consecutive frames, the techniques of this disclosure may infer 3D structures and detect objects even when they are partially or fully occluded from certain viewpoints. As yet another example, these techniques may provide consistency analysis for confidence estimation. These techniques allow for the analysis of consistency across multiple frames, which may enable the estimation of confidence levels for detected objects. This helps to distinguish between reliable and potentially spurious detections, which may lead to more trustworthy results.

Figure 4A:
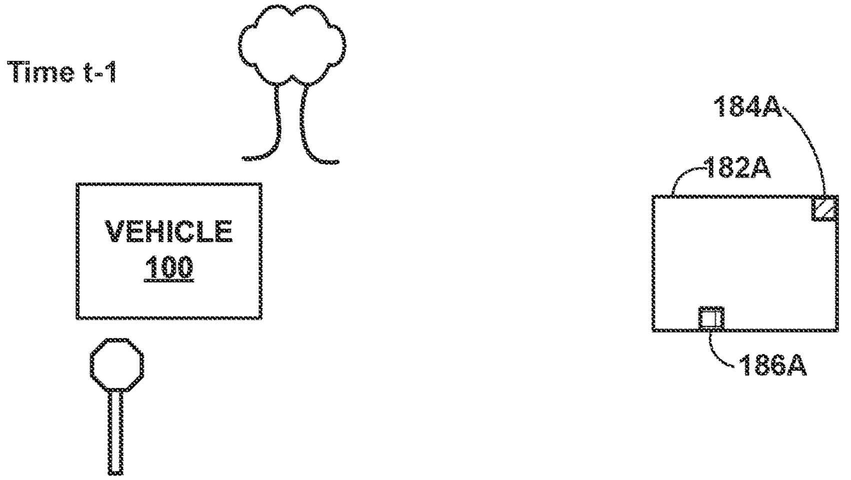
FIGS. 4A-4C are conceptual diagrams illustrating an example depiction of a real world scene including vehicle 100 and objects around vehicle 100 at different times as vehicle 100 is moving.
Figure 4B:
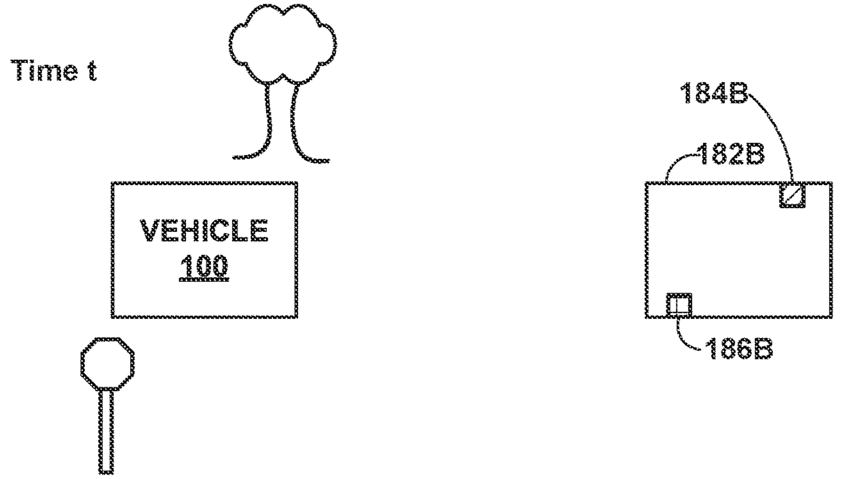
Figure 4C:
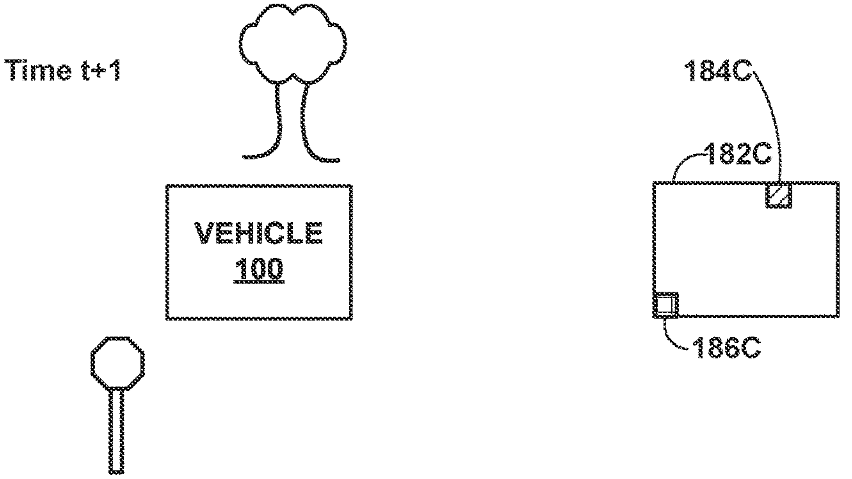

FIGS. 4A-4C are conceptual diagrams illustrating an example depiction of a real world scene including vehicle 100 and objects around vehicle 100 at different times as vehicle 100 is moving. FIGS. 4A-4C also depict voxel representations 182A-182C of the real world objects as may be generated using LIDAR features and/or image features of the objects. FIG. 4A depicts the scene at time t−1, in which voxel representation 182A includes voxels 184A and 186A. FIG. 4B depicts the scene at time t, in which voxel representation 182B includes voxels 184B and 186B. FIG. 4C depicts the scene at time t+1, in which voxel representation 182C includes voxels 184C and 186C.

Per the techniques of this disclosure, LIDAR features for voxels 184A, 184B, and 184C may generally be the same, e.g., have the same occupancy data. Additionally, image features for voxels 184A, 184B, and 184C may generally be the same, e.g., have the same color, texture information, or the like. Moreover, voxels 184A, 184B, and 184C are spatially close to each other across voxel representations 182A, 182B, and 182C. Therefore, voxels 184A, 184B, and 184C may be determined to correspond to the same real world object (e.g., a tree).

Similarly, LIDAR features for voxels 186A, 186B, and 186C may generally be the same, e.g., have the same occupancy data. Additionally, image features for voxels 186A, 186B, and 186C may generally be the same, e.g., have the same color information, texture information, or the like. Moreover, voxels 186A, 186B, and 186C are spatially close to each other across voxel representations 182A, 182B, and 182C. Therefore, voxels 186A, 186B, and 186C may be determined to correspond to the same real world object (e.g., a stop sign).

FIG. 5 is a block diagram illustrating an example vehicle 310 with a multi-camera system and autonomous driving controller 316 according to techniques of this disclosure. In particular, vehicle 310 includes cameras 312A-312G, LIDAR unit 314, and odometry unit 318. In this example, cameras 312A and 312B are front-facing cameras with different focal lengths, cameras 312C and 312D are side-rear facing cameras, cameras 312E and 312F are side-front facing cameras, and camera 312G is a rear-facing camera. In this manner, imagery can be captured by the collection of cameras 312A-312G for a 360 degree view around vehicle 310.

LIDAR unit 314 may generate LIDAR/point cloud data around vehicle 310 in 360 degrees. Thus, LIDAR/point cloud data may be generated for images captured by each of cameras 312A-312G. Both images and LIDAR data may be provided to autonomous driving controller 316. Odometry unit 318 collects and provides odometry data (e.g., position and rotation data, also referred to as pose data) to autonomous driving controller 316.

Autonomous driving controller 316 may include components similar to those of autonomous driving controller 120 of FIG. 2. For example, autonomous driving controller 316 may include a depth determination unit that performs the techniques of this disclosure, as discussed above, to extract features from the images and LIDAR data, fuse the extracted features, then generate a depth map from the fused features. In particular, autonomous driving controller 316 may track features extracted from images and LIDAR data over time, e.g., from consecutive frames, according to the techniques of this disclosure, to generate a BEV representation of a real-world space around vehicle 310. Autonomous driving controller 316 may then use the BEV representation when making autonomous driving decisions to control vehicle 310.

Figure 6:
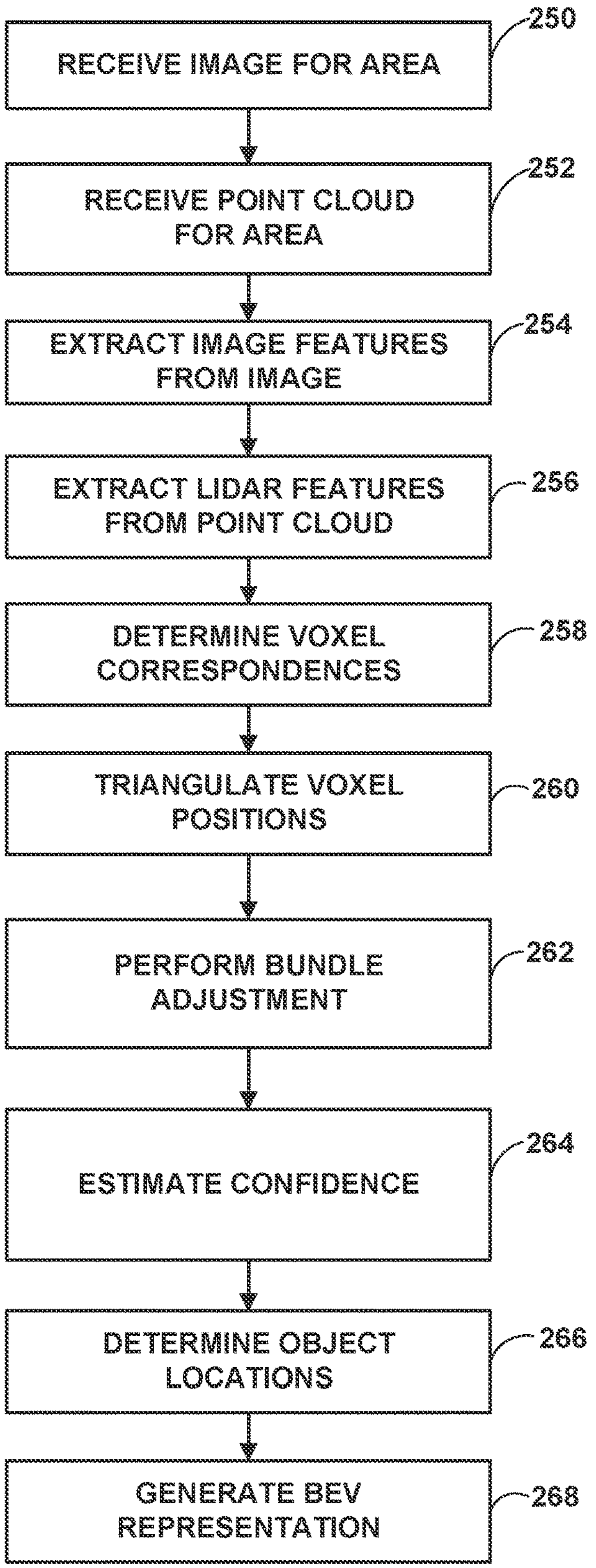
FIG. 6 is a flowchart illustrating an example method of training a neural network according to techniques of this disclosure.

FIG. 6 is a flowchart illustrating an example method of constructing a bird's eye view (BEV) representation of a real-world space according to techniques of this disclosure. The method of FIG. 6 is described with respect to depth determination unit 180 of FIG. 3 for purposes of explanation. However, other units or devices may be configured to perform this or a similar method.

Initially, depth determination unit 180 receives an image for an area (250), e.g., an area around or near vehicle 100 (FIG. 1). Depth determination unit 180 also receives a point could cloud for the area (252), which may correspond to a point cloud generated by a LIDAR unit. The method of FIG. 6 represents the techniques of this disclosure as performed for a current time t. When performing these techniques, image and point cloud data is also collected for a previous frame at time t−1 and/or a next frame at time t+1, as discussed above. Depth determination unit 180 may extract image features from the image (254) and extract LIDAR features from the point cloud (256).

Depth determination unit 180 may then determine correspondences between both voxel image features and voxel LIDAR features between frames t−1, t, and/or t+1 (258). For example, depth determination unit 180 may determine voxels that are spatially near each other between the various frames, as well as whether those voxels share similar image features and/or LIDAR features. Voxels between frames that are spatially near each other and that share similar or the same image and/or LIDAR features may be said to correspond, such that those voxels represent the same object in real world space.

Depth determination unit 180 may then perform triangulation on the voxel positions (260). For example, as discussed above, depth determination unit 180 may determine finding intersection points of rays emanating from the positions of the corresponding voxel features in the various time steps, resulting to a determination of the 3D positions of the triangulated voxels at each time step.

Depth determination unit 180 may then perform bundle adjustment (262). For example, as discussed above, depth determination unit 180 may adjust positions of the triangulated voxels and camera poses to minimize reprojection error between observed features and corresponding projections. Depth determination unit 180 may then estimate confidence values for the determined positions (264). Based on the confidence values, depth determination unit 180 may determine object locations (266), that is, locations of real-world objects represented by the voxels relative to, e.g., vehicle 100 (FIG. 1), and generate a bird's eye view (BEV) representation of the locations of the real-world objects relative to the position of vehicle 100 (268).

In this manner, the method of FIG. 6 represents an example of a method of processing media data, including forming a first voxel representation of a three-dimensional space at a first time using a first image of the three-dimensional space captured by a camera of a moving object having a first pose and a first point cloud of the three-dimensional space captured by a unit of the moving object; determining a first set of features for voxels in the first voxel representation, the first set of features representing visual characteristics of the corresponding voxels; forming a second voxel representation of the three-dimensional space at a second time using a second image of the three-dimensional space captured by the camera of the moving object having a second pose and a second point cloud of the three-dimensional space captured by the unit of the moving object; determining a second set of features for voxels in the second voxel representation; determining correspondences between the voxels in the first voxel representation and the voxels in the second voxel representation according to similarities between the first set of features and the second set of features; and determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Various examples of the techniques of this disclosure are summarized in the following clauses:

Clause 1: A method of processing media data, the method comprising: forming a first voxel representation of a three-dimensional space at a first time using a first image of the three-dimensional space captured by a camera of a moving object having a first pose and a first point cloud of the three-dimensional space captured by a unit of the moving object; determining a first set of features for voxels in the first voxel representation, the first set of features representing visual characteristics of the corresponding voxels; forming a second voxel representation of the three-dimensional space at a second time using a second image of the three-dimensional space captured by the camera of the moving object having a second pose and a second point cloud of the three-dimensional space captured by the unit of the moving object; determining a second set of features for voxels in the second voxel representation; determining correspondences between the voxels in the first voxel representation and the voxels in the second voxel representation according to similarities between the first set of features and the second set of features; and determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Clause 2: The method of clause 1, further comprising calculating the similarities between the first set of features and the second set of features according to at least one of Euclidean distances or feature descriptor matching.

Clause 3: The method of clause 1, further comprising determining the first pose for the moving object using a global positioning system (GPS) unit of the moving object, and determining the second pose for the moving object using the GPS unit.

Clause 4: The method of clause 1, wherein determining the positions of the voxels comprises calculating distances between the voxels and the moving object using triangulation at the first time and at the second time.

Clause 5: The method of clause 1, wherein the visual characteristics include one or more of occupancy information, intensity values, color values, local geometric descriptors, texture descriptors, or local image features.

Clause 6: The method of clause 1, further comprising performing bundle adjustments on the voxels in the first voxel representation and the voxels in the second voxel representation to minimize a reprojection error between the first set of features, the second set of features, and projections of the first set of features and the second set of features.

Clause 7: The method of clause 1, further comprising calculating one or more confidence values for the determined positions of the objects in the three-dimensional space.

Clause 8: The method of clause 7, wherein calculating the one or more confidence values comprises calculating a structure confidence value, a temporal consistency value, and an application confidence value, and calculating an overall confidence value as a weighted combination of the structure confidence value, the temporal consistency value, and the application confidence value.

Clause 9: The method of clause 1, wherein the moving object comprises a vehicle, the method further comprising using the positions of the objects to at least partially autonomously control the vehicle.

Clause 10: A device for processing media data, the device comprising: a memory for storing media data; and a processing system comprising one or more processors implemented in circuitry, the processing system being configured to: form a first voxel representation of a three-dimensional space at a first time using a first image of the three-dimensional space captured by a camera of a moving object having a first pose and a first point cloud of the three-dimensional space captured by a unit of the moving object; determine a first set of features for voxels in the first voxel representation, the first set of features representing visual characteristics of the corresponding voxels; form a second voxel representation of the three-dimensional space at a second time using a second image of the three-dimensional space captured by the camera of the moving object having a second pose and a second point cloud of the three-dimensional space captured by the unit of the moving object; determine a second set of features for voxels in the second voxel representation; determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Clause 11: The device of clause 10, wherein the processing system is further configured to calculate the similarities between the first set of features and the second set of features according to at least one of Euclidean distances or feature descriptor matching.

Clause 12: The device of clause 10, wherein the processing system is further configured to receive data representing the first pose for the moving object and data representing the second pose for the moving object from a global positioning system (GPS) unit.

Clause 13: The device of clause 10, wherein to determine the positions of the voxels, the processing system is configured to calculate distances between the voxels and the moving object using triangulation at the first time and at the second time.

Clause 14: The device of clause 10, wherein the visual characteristics include one or more of occupancy information, intensity values, color values, local geometric descriptors, texture descriptors, or local image features.

Clause 15: The device of clause 10, wherein the processing system is further configured to perform bundle adjustments on the voxels in the first voxel representation and the voxels in the second voxel representation to minimize a reprojection error between the first set of features, the second set of features, and projections of the first set of features and the second set of features.

Clause 16: The device of clause 10, wherein the processing system is further configured to calculate one or more confidence values for the determined positions of the objects in the three-dimensional space.

Clause 17: The device of clause 16, wherein to calculate the one or more confidence values, the processing system is configured to calculate a structure confidence value, a temporal consistency value, an application confidence value, and an overall confidence value as a weighted combination of the structure confidence value, the temporal consistency value, and the application confidence value.

Clause 18: The device of clause 10, wherein the moving object comprises a vehicle, and wherein the processing system is configured to use the positions of the objects to at least partially autonomously control the vehicle.

Clause 19: The device of clause 10, wherein the device comprises one or more of a camera, a computer, a mobile device, a broadcast receiver device, or a set-top box.

Clause 20: A device for processing media data, the device comprising: means for forming a first voxel representation of a three-dimensional space at a first time using a first image of the three-dimensional space captured by a camera of a moving object having a first pose and a first point cloud of the three-dimensional space captured by a unit of the moving object; means for determining a first set of features for voxels in the first voxel representation, the first set of features representing visual characteristics of the corresponding voxels; means for forming a second voxel representation of the three-dimensional space at a second time using a second image of the three-dimensional space captured by the camera of the moving object having a second pose and a second point cloud of the three-dimensional space captured by the unit of the moving object; means for determining a second set of features for voxels in the second voxel representation; means for determining correspondences between the voxels in the first voxel representation and the voxels in the second voxel representation according to similarities between the first set of features and the second set of features; and means for determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Clause 21: A method of processing media data, the method comprising: forming a first voxel representation of a three-dimensional space at a first time using a first image of the three-dimensional space captured by a camera of a moving object having a first pose and a first point cloud of the three-dimensional space captured by a unit of the moving object; determining a first set of features for voxels in the first voxel representation, the first set of features representing visual characteristics of the corresponding voxels; forming a second voxel representation of the three-dimensional space at a second time using a second image of the three-dimensional space captured by the camera of the moving object having a second pose and a second point cloud of the three-dimensional space captured by the unit of the moving object; determining a second set of features for voxels in the second voxel representation; determining correspondences between the voxels in the first voxel representation and the voxels in the second voxel representation according to similarities between the first set of features and the second set of features; and determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Clause 22: The method of clause 21, further comprising calculating the similarities between the first set of features and the second set of features according to at least one of Euclidean distances or feature descriptor matching.

Clause 23: The method of any of clauses 21 and 22, further comprising determining the first pose for the moving object using a global positioning system (GPS) unit of the moving object, and determining the second pose for the moving object using the GPS unit.

Clause 24: The method of any of clauses 21-23, wherein determining the positions of the voxels comprises calculating distances between the voxels and the moving object using triangulation at the first time and at the second time.

Clause 25: The method of any of clauses 21-24, wherein the visual characteristics include one or more of occupancy information, intensity values, color values, local geometric descriptors, texture descriptors, or local image features.

Clause 26: The method of any of clauses 21-25, further comprising performing bundle adjustments on the voxels in the first voxel representation and the voxels in the second voxel representation to minimize a reprojection error between the first set of features, the second set of features, and projections of the first set of features and the second set of features.

Clause 27: The method of any of clauses 21-26, further comprising calculating one or more confidence values for the determined positions of the objects in the three-dimensional space.

Clause 28: The method of clause 27, wherein calculating the one or more confidence values comprises calculating a structure confidence value, a temporal consistency value, and an application confidence value, and calculating an overall confidence value as a weighted combination of the structure confidence value, the temporal consistency value, and the application confidence value.

Clause 29: The method of any of clauses 21-28, wherein the moving object comprises a vehicle, the method further comprising using the positions of the objects to at least partially autonomously control the vehicle.

Clause 30: A device for processing media data, the device comprising: a memory for storing media data; and a processing system comprising one or more processors implemented in circuitry, the processing system being configured to: form a first voxel representation of a three-dimensional space at a first time using a first image of the three-dimensional space captured by a camera of a moving object having a first pose and a first point cloud of the three-dimensional space captured by a unit of the moving object; determine a first set of features for voxels in the first voxel representation, the first set of features representing visual characteristics of the corresponding voxels; form a second voxel representation of the three-dimensional space at a second time using a second image of the three-dimensional space captured by the camera of the moving object having a second pose and a second point cloud of the three-dimensional space captured by the unit of the moving object; determine a second set of features for voxels in the second voxel representation; determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

Clause 31: The device of clause 30, wherein the processing system is further configured to calculate the similarities between the first set of features and the second set of features according to at least one of Euclidean distances or feature descriptor matching.

Clause 32: The device of any of clauses 30 and 31, wherein the processing system is further configured to receive data representing the first pose for the moving object and data representing the second pose for the moving object from a global positioning system (GPS) unit.

Clause 33: The device of any of clauses 30-32, wherein to determine the positions of the voxels, the processing system is configured to calculate distances between the voxels and the moving object using triangulation at the first time and at the second time.

Clause 34: The device of any of clauses 30-33, wherein the visual characteristics include one or more of occupancy information, intensity values, color values, local geometric descriptors, texture descriptors, or local image features.

Clause 35: The device of any of clauses 30-34, wherein the processing system is further configured to perform bundle adjustments on the voxels in the first voxel representation and the voxels in the second voxel representation to minimize a reprojection error between the first set of features, the second set of features, and projections of the first set of features and the second set of features.

Clause 36: The device of any of clauses 30-35, wherein the processing system is further configured to calculate one or more confidence values for the determined positions of the objects in the three-dimensional space.

Clause 37: The device of clause 36, wherein to calculate the one or more confidence values, the processing system is configured to calculate a structure confidence value, a temporal consistency value, an application confidence value, and an overall confidence value as a weighted combination of the structure confidence value, the temporal consistency value, and the application confidence value.

Clause 38: The device of any of clauses 30-37, wherein the moving object comprises a vehicle, and wherein the processing system is configured to use the positions of the objects to at least partially autonomously control the vehicle.

Clause 39: The device of any of clauses 30-38, wherein the device comprises one or more of a camera, a computer, a mobile device, a broadcast receiver device, or a set-top box.

Clause 40: A computer-readable storage medium having stored thereon instructions that, when executed, cause a processing system to: form a first voxel representation of a three-dimensional space at a first time using a first image of the three-dimensional space captured by a camera of a moving object having a first pose and a first point cloud of the three-dimensional space captured by a unit of the moving object; determine a first set of features for voxels in the first voxel representation, the first set of features representing visual characteristics of the corresponding voxels; form a second voxel representation of the three-dimensional space at a second time using a second image of the three-dimensional space captured by the camera of the moving object having a second pose and a second point cloud of the three-dimensional space captured by the unit of the moving object; determine a second set of features for voxels in the second voxel representation; determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:

forming a first voxel representation of a three-dimensional space at a first time using a first image of the three-dimensional space captured by a camera of a moving object having a first pose and a first point cloud of the three-dimensional space captured by a sensor of the moving object;

determining a first set of features for voxels in the first voxel representation, the first set of features representing visual characteristics of the corresponding voxels;

forming a second voxel representation of the three-dimensional space at a second time using a second image of the three-dimensional space captured by the camera of the moving object having a second pose and a second point cloud of the three-dimensional space captured by the sensor of the moving object;

determining a second set of features for voxels in the second voxel representation;

determining correspondences between the voxels in the first voxel representation and the voxels in the second voxel representation according to similarities between the first set of features and the second set of features; and determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

2. The method of claim 1, further comprising calculating the similarities between the first set of features and the second set of features according to at least one of Euclidean distances or feature descriptor matching.

3. The method of claim 1, further comprising determining the first pose for the moving object using a global positioning system (GPS) unit of the moving object, and determining the second pose for the moving object using the GPS unit.

4. The method of claim 1, wherein determining the positions of the voxels comprises calculating distances between the voxels and the moving object using triangulation at the first time and at the second time.

5. The method of claim 1, wherein the visual characteristics include one or more of occupancy information, intensity values, color values, local geometric descriptors, texture descriptors, or local image features.

6. The method of claim 1, further comprising performing bundle adjustments on the voxels in the first voxel representation and the voxels in the second voxel representation to minimize a reprojection error between the first set of features, the second set of features, and projections of the first set of features and the second set of features.

7. The method of claim 1, further comprising calculating one or more confidence values for the determined positions of the objects in the three-dimensional space.

8. The method of claim 7, wherein calculating the one or more confidence values comprises calculating a structure confidence value, a temporal consistency value, and an application confidence value, and calculating an overall confidence value as a weighted combination of the structure confidence value, the temporal consistency value, and the application confidence value.

9. The method of claim 1, wherein the moving object comprises a vehicle, the method further comprising using the positions of the objects to at least partially autonomously control the vehicle.

10. A device for processing media data, the device comprising:

a memory for storing media data; and a processing system comprising one or more processors implemented in circuitry, the processing system being configured to:

form a first voxel representation of a three-dimensional space at a first time using a first image of the three-dimensional space captured by a camera of a moving object having a first pose and a first point cloud of the three-dimensional space captured by a unit of the moving object;

determine a first set of features for voxels in the first voxel representation, the first set of features representing visual characteristics of the corresponding voxels;

form a second voxel representation of the three-dimensional space at a second time using a second image of the three-dimensional space captured by the camera of the moving object having a second pose and a second point cloud of the three-dimensional space captured by the unit of the moving object;

determine a second set of features for voxels in the second voxel representation;

determine correspondences between the voxels in the first voxel representation and the voxels in the second voxel representation according to similarities between the first set of features and the second set of features; and determine positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

11. The device of claim 10, wherein the processing system is further configured to calculate the similarities between the first set of features and the second set of features according to at least one of Euclidean distances or feature descriptor matching.

12. The device of claim 10, wherein the processing system is further configured to receive data representing the first pose for the moving object and data representing the second pose for the moving object from a global positioning system (GPS) unit.

13. The device of claim 10, wherein to determine the positions of the voxels, the processing system is configured to calculate distances between the voxels and the moving object using triangulation at the first time and at the second time.

14. The device of claim 10, wherein the visual characteristics include one or more of occupancy information, intensity values, color values, local geometric descriptors, texture descriptors, or local image features.

15. The device of claim 10, wherein the processing system is further configured to perform bundle adjustments on the voxels in the first voxel representation and the voxels in the second voxel representation to minimize a reprojection error between the first set of features, the second set of features, and projections of the first set of features and the second set of features.

16. The device of claim 10, wherein the processing system is further configured to calculate one or more confidence values for the determined positions of the objects in the three-dimensional space.

17. The device of claim 16, wherein to calculate the one or more confidence values, the processing system is configured to calculate a structure confidence value, a temporal consistency value, an application confidence value, and an overall confidence value as a weighted combination of the structure confidence value, the temporal consistency value, and the application confidence value.

18. The device of claim 10, wherein the moving object comprises a vehicle, and wherein the processing system is configured to use the positions of the objects to at least partially autonomously control the vehicle.

19. The device of claim 10, wherein the device comprises one or more of a camera, a computer, a mobile device, a broadcast receiver device, or a set-top box.

20. A device for processing media data, the device comprising:

means for forming a first voxel representation of a three-dimensional space at a first time using a first image of the three-dimensional space captured by a camera of a moving object having a first pose and a first point cloud of the three-dimensional space captured by a unit of the moving object;

means for determining a first set of features for voxels in the first voxel representation, the first set of features representing visual characteristics of the corresponding voxels;

means for forming a second voxel representation of the three-dimensional space at a second time using a second image of the three-dimensional space captured by the camera of the moving object having a second pose and a second point cloud of the three-dimensional space captured by the unit of the moving object;

means for determining a second set of features for voxels in the second voxel representation;

means for determining correspondences between the voxels in the first voxel representation and the voxels in the second voxel representation according to similarities between the first set of features and the second set of features; and means for determining positions of objects in the three-dimensional space relative to the moving object according to the first pose, the second pose, and the correspondences between the voxels in the first voxel representation and the voxels in the second voxel representation, the objects being represented by the voxels in the first voxel representation and the voxels in the second voxel representation.

* * * * *